US012763689B2

(12) United States Patent
Lin

(10) Patent No.: US 12,763,689 B2
(45) Date of Patent: Oct. 13, 2026

(54) SWITCHING MODE POWER SUPPLY WITH SINGLE POWER LINE DETECTION CIRCUIT

(71) Applicant: Nanjing Greenchip Semiconductor Co., Ltd., Nanjing (CN)

(72) Inventor: William Lin, Nanjing (CN)

(73) Assignee: Nanjing Greenchip Semiconductor Co., Ltd., Nanjing (CN)

( * ) Notice: Subject to any disclaimer, the term of this patent is extended or adjusted under 35 U.S.C. 154(b) by 180 days.

(21) Appl. No.: 18/968,608

(22) Filed: Dec. 4, 2024

(65) Prior Publication Data

US 2026/0142576 A1 May 21, 2026

(30) Foreign Application Priority Data

Nov. 15, 2024 (CN) ......................... 202411632204.7

(51) Int. Cl.
*H02M 3/335* (2006.01)
*H02M 1/32* (2007.01)
*H02M 1/36* (2007.01)

(52) U.S. Cl.
CPC ....... *H02M 3/33507* (2013.01); *H02M 1/322* (2021.05); *H02M 1/36* (2013.01)

(58) Field of Classification Search
CPC ..... H02M 3/33507; H02M 1/322; H02M 1/36
USPC ...................................................... 363/21.12
See application file for complete search history.

(56) References Cited

U.S. PATENT DOCUMENTS

| | | | | |
|---|---|---|---|---|
| 2012/0020132 | A1* | 1/2012 | Chan | H02M 1/36 363/126 |
| 2015/0288286 | A1* | 10/2015 | Chu | H02M 3/33507 363/21.12 |
| 2017/0155316 | A1* | 6/2017 | Fawaz | H02M 3/33523 |
| 2018/0309369 | A1* | 10/2018 | Radic | H02M 3/33507 |
| 2020/0083813 | A1* | 3/2020 | Tang | H02M 3/33523 |

* cited by examiner

*Primary Examiner* — Yemane Mehari
(74) *Attorney, Agent, or Firm* — WPAT, PC

(57) ABSTRACT

The present invention discloses a switching mode power supply with single power line detection circuit, which includes a power conversion circuit receiving an AC input voltage from an input side and converting the AC input voltage into a DC output voltage, a safety capacitor connected across the input side, a control unit coupled to the power conversion circuit to control an operation of the power conversion circuit, a detection circuit coupled to the safety capacitor, the power conversion circuit and the control unit. The control unit determines whether the switching mode power supply is in a single power line connection state based on a waveform of a voltage signal or a current signal detected by the detection circuit.

20 Claims, 5 Drawing Sheets

SWITCHING MODE POWER SUPPLY WITH SINGLE POWER LINE DETECTION CIRCUIT

TECHNICAL FIELD

The present invention relates to switching mode power supplies (SMPS), in particular to a switching mode power supply with single power line detection circuit.

BACKGROUND

As well known in power electronic system, the switching mode power supply technology has been widely used in the field of power circuits for the sake of conversion efficiency and product volume.

Power supplies are indispensable in consumer electronic products. Almost every electronic product requires a power supply to convert the utility power into the voltage or current required by the core circuits in the electronic product. Also, because the power supply is closely related to people's daily life, the power supply needs to be equipped with a protection mechanism based on safety requirements.

FIG. 1 shows the conventional switching mode power supply, which has flyback AC-to-DC framework. As shown in FIG. 1, the typical flyback AC-to-DC power converter includes a safety capacitor Cx, a resistor 102, an input rectification and filtering unit 103, a primary side voltage clamping snubber 104, a main transformer 105, an output rectification and filtering unit 106, a feedback network 107, an NMOS transistor 108, a current-sensing resistor 109, a pulse width modulation (PWM) controller 110, an auxiliary winding 111 and an auxiliary rectification and filtering unit 112. The safety capacitor Cx is connected between two-line voltages to filter out the EMI noise, and the resistor 102 is used to discharge the safety capacitor Cx when the AC power is plugged off, to prevent the user from getting electric shock. The functions of the rest parts of the adapter are briefly stated as follow. The input rectification and filtering unit 103 is used to generate a main input voltage $V_{IN}$ according to the AC power. The primary side voltage clamping snubber 104 is used to clamp the maximum primary side voltage of the main transformer 105 when the NMOS transistor 108 is off. The main transformer 105, having a primary side coupled to the main input voltage $V_{IN}$ and a secondary side coupled to the output rectification and filtering unit 106, is employed to convert power from the AC power to the DC output $V_{out}$ of the adapter. The output rectification and filtering unit 106 is utilized to generate a DC output voltage $V_{out}$. The feedback network 107 is used to generate a feedback signal $V_{FB}$, which is coupled to the FB pin of the PWM controller 110, according to an error signal derived from a reference voltage and the DC output voltage $V_{out}$. The NMOS transistor 108, responsive to a gating signal $V_G$, is used to control the power conversion via the main transformer 105. The current-sensing resistor 109 is utilized to carry a current sensing signal $V_{CS}$. The PWM controller 110 is used to generate the gating signal $V_G$ according to the feedback signal $V_{FB}$ and the current sensing signal $V_{CS}$ to regulate the DC output voltage $V_{out}$ at an expected level. The auxiliary winding 111 and the auxiliary rectification and filtering unit 112 are employed to generate a DC supply voltage $V_{CC}$ for the operation of the PWM controller 110. The PWM controller 110 is an integrated circuitry (IC), having VIN, VCC, CS, FB and DRV pins to connect with peripheral components. The PWM controller 110 can provide PWM signal $V_G$ via DRV pin to periodically switch NMOS transistor 108. When the NMOS transistor 108 is turned on, the primary side winding of the transformer stores energy. When the NMOS transistor 108 is turned off, the transformer 105 releases energy through the secondary winding and the auxiliary winding 111 to respectively establish an output power $V_{out}$ to the load 113 and an operating power VCC to the PWM controller 110.

When the AC power is connected to the switching mode power supply, the NMOS transistor 108 is periodically switched between on and off through the gate control signal $V_G$ of the PWM controller 110, and the input electric energy is converted to the output through the main transformer 105. If the AC power only has a single power line input, i.e., the neutral line N is disconnected and the live wire L remains connected, the system is leaking current. The system's leakage current will charge and increase the voltage of the primary side capacitors C1 and C2 of the switching mode power supply 10, thus the PWM controller 110 is allowed to operate normally, and the switching mode power supply 10 will establish the output voltage $V_{out}$, causing the load 113, such as the electrical equipment, to restart. As a result, it is easy to cause unnecessary damage to the connected electrical equipment.

In order to effectively solve this issue, it is necessary to propose a single power line detection circuit for the switching mode power supply.

SUMMARY OF THE INVENTION

In order to improve the above deficiencies, according to one aspect of the present invention, a switching mode power supply with single power line detection circuit is disclosed, which includes a power conversion circuit receiving an AC input voltage from an input side and converting the AC input voltage into a DC output voltage, a safety capacitor connected across the input side, a control unit coupled to the power conversion circuit to control an operation of the power conversion circuit, a detection circuit coupled to the safety capacitor, the power conversion circuit and the control unit. The control unit determines whether the switching mode power supply is in a single power line connection state based on a waveform of a voltage signal or a current signal detected by the detection circuit.

In one preferred embodiment, the detection circuit includes a first diode, having an anode of the first diode connected to a neutral line (N) of the input side, a second diode, having an anode of the second diode connected to a live wire (L) of the input side, a first resistor, having a first end of the first resistor connected to the control unit. The cathodes of the first diode and the second diode are commonly connected and connected to the second end of the first resistor. The first diode and the second diode are used to receive the AC input voltage and output a rectified voltage signal. The rectified voltage signal generates a rectified current signal flowing into the control unit through the first resistor. The control unit receives the rectified voltage signal and the rectified current signal, and determines whether the switching mode power supply is in the single power line connection state by comparing the waveform of the rectified voltage signal or the rectified current signal. When the rectified voltage signal or the rectified current signal is a half-wave waveform, the switching mode power supply is in the single power line connection state. When the switching mode power supply is in the single power line connection state, wherein the control unit is turned off the power conversion circuit through its internal circuit to stop outputting voltage to a load coupled thereto.

In one preferred embodiment, the power conversion circuit further includes an input rectification and filtering unit coupled to the safety capacitor and performs full-wave rectification and filtering on the AC input voltage to generate an input voltage, a transformer conversion circuit coupled to the rectification and filtering unit, and is controlled by the control unit to transform the input voltage to generate the DC output voltage, and an auxiliary winding unit coupled to the transformer conversion circuit to generate a DC supply voltage for the control unit. The auxiliary winding unit includes an auxiliary winding having a first end and a second end, the second end connected to ground, an auxiliary rectification and filtering unit including a filter resistor, a third diode and a filter capacitor, where one end of the filter resistor is connected to the first end of the auxiliary winding, another end of the filter resistor being connected to an anode of the third diode, a positive end of the filter capacitor being connected to a cathode of the third diode, and a negative end of the filter capacitor being connected to the second of the auxiliary winding. The cathode of the third diode is coupled to the control unit.

According to another aspect of the present invention, a switching mode power supply with single power line detection circuit is disclosed, which includes a power conversion circuit receiving an AC input voltage from an input side and converting the AC input voltage into a DC output voltage, a safety capacitor connected across the input side, a control unit coupled to the power conversion circuit to control an operation of the power conversion circuit, a detection circuit coupled to the safety capacitor, the power conversion circuit and the control unit. The power conversion circuit further includes an input rectification and filtering unit coupled to the safety capacitor and performs full-wave rectification and filtering on the AC input voltage to generate an input voltage, a transformer conversion circuit coupled to the rectification and filtering unit, and is controlled by the control unit to transform the input voltage to generate the DC output voltage, and an auxiliary winding unit coupled to the transformer conversion circuit to generate a DC supply voltage for the control unit. The control unit determines whether the switching mode power supply is in a single power line connection state based on a waveform of a voltage signal or a current signal detected by the detection circuit.

The beneficial effects of the present invention can be realized through using the internal circuit of the control unit to determine whether the switching power supply is in a single power line connection state by comparing the waveform and peak value of the rectified voltage or rectified current signal. Through the operation of the control unit, enabling that the power converter can stop outputting voltage to provide load protection while the switching power supply is in a single power line connection state.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

The present invention discloses a switching mode power supply, such as a flyback converter, with a single power line detection circuit.

Figure 2:
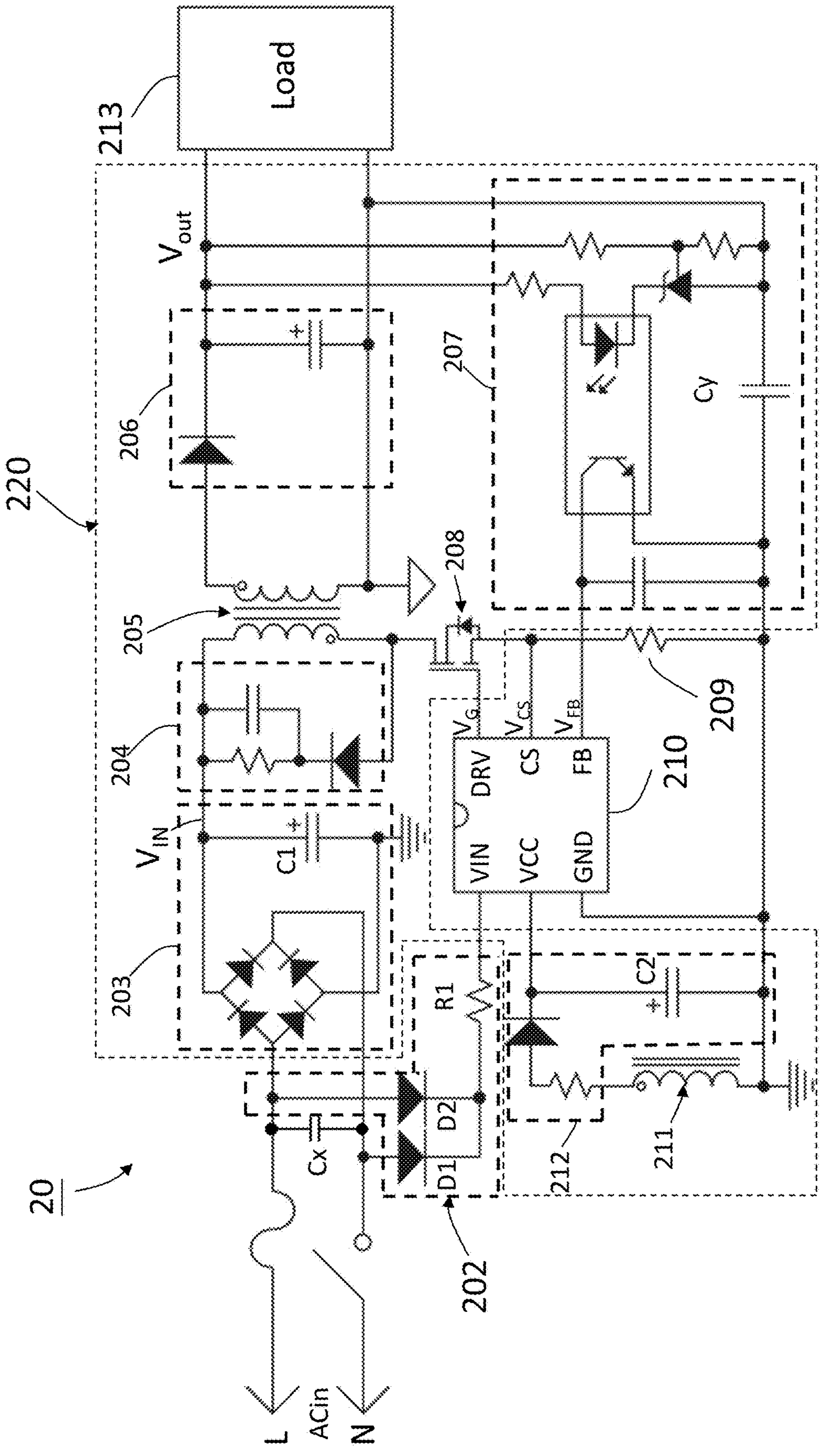
FIG. 2 is a schematic system circuit diagram of a switching mode power supply with single power line detection circuit according to one embodiment of the present invention.

FIG. 2 shows the schematic system circuit diagram of a switching mode power supply with single power line detection circuit according to one embodiment of the present invention. Referring to FIG. 2, a switching mode power supply 20 (for example, a flyback power converter) receives an AC input voltage ACin (for example, the utility power, through the invention is not limited thereto) through an input side, converts the AC input voltage ACin into a DC output voltage $V_{out}$ and outputs DC output voltage $V_{out}$ to a load 213 via an output side. The switching mode power supply 20 includes a power conversion circuit 220, a safety capacitor Cx and a control unit 210. In the present invention, a detection circuit 202 is coupled to the safety capacitor Cx and an input rectification and filtering unit 203. The detection circuit 202 is used to detect the voltage signal or the current signal for determining whether the switching mode power supply 20 is in a single power line connection state, i.e., L is connected and N is disconnected. In the present invention, the power conversion circuit 220 includes the input rectification and filtering unit 203 (including a full-bridge rectifier circuit and a filter capacitor C1) and a transformer conversion circuit having a power switch (such as an NMOS transistor) 208, a transformer 205, an output rectification and filtering unit 206.

The input rectification and filtering unit 203 is coupled to the safety capacitor Cx, performs full-wave rectification on the noise-suppressed AC input voltage ACin to generate an input voltage $V_{IN}$. The first filter capacitor C1 is employed to filter the input voltage $V_{IN}$ generated by the input rectification and filtering unit 203.

In the transformer conversion circuit, the transformer 205 has a primary side and a secondary side. The primary side of the transformer 205 is coupled to the first terminal of the first filter capacitor C1 used to receive the input voltage $V_{IN}$. The power switch 208 is, for example, a NMOS transistor, the first terminal (drain) of the NMOS transistor is coupled to the primary side of the transformer 205, and the power switch 208 is switching under control of a driving signal generated by the control unit 210. The secondary side of the transformer 205 is coupled to the output rectification and filtering unit 206. Therefore, the transformer 205 induces an induction voltage related to the input voltage $V_{IN}$ at the secondary side in response to switching of the power switch 208 and a turns ratio of the coils of the primary side and the secondary side. The induction voltage is converted into the DC output voltage $V_{out}$ under functions of the output rectification and filtering unit 206. In other words, the transformer conversion circuit can transform and convert the output of the filter capacitor C1 into the DC output voltage $V_{out}$ in response to the driving signal.

Figure 1:
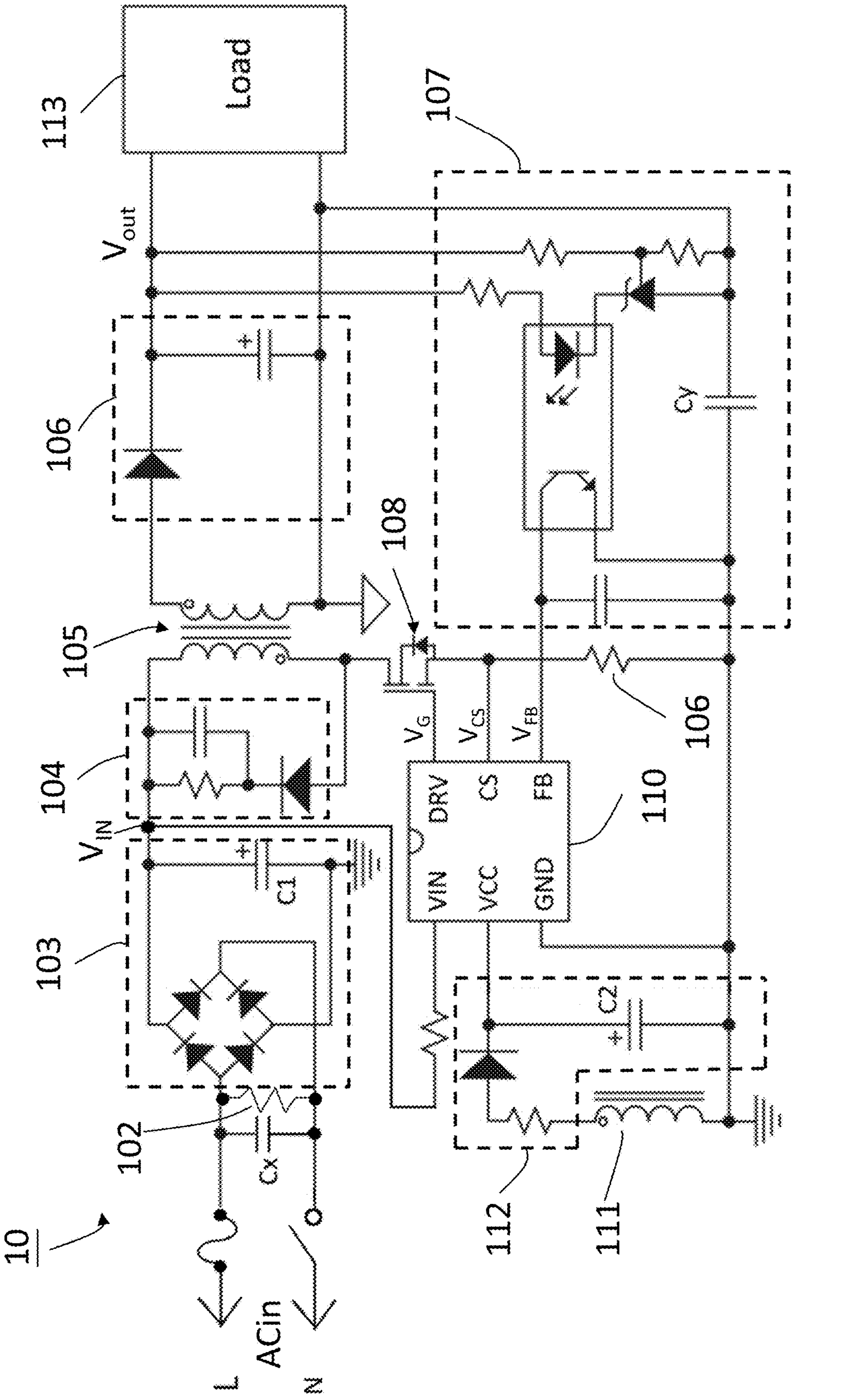
FIG. 1 shows the system circuit architecture of the switching mode power supply according to a prior art.

Similar to the flyback power converter depicted in FIG. 1, the power conversion circuit 220 further includes a primary side voltage clamping snubber 204 for clamping the maximum primary side voltage of the transformer 205 when the NMOS transistor 208 is off. A feedback network 207 is used to generate a feedback signal $V_{FB}$, which is coupled to the control unit 210, for example, the FB pin of the PWM controller, according to an error signal derived from a reference voltage and the DC output voltage $V_{out}$. A current-sensing resistor 209 is used to carry a current sensing signal $V_{CS}$. The control unit 210, such as the PWM controller, is used to generate the gating signal $V_G$ according to the feedback signal $V_{FB}$ and the current sensing signal $V_{CS}$ to regulate the DC output voltage $V_{out}$ at an expected level. An auxiliary winding 211 and the auxiliary rectification and filtering unit 212 are used to generate a DC supply voltage $V_{CC}$ for the operation of the control unit 210 (i.e., the PWM controller).

The control unit 210 is an integrated circuit (IC), which has a plurality of pins, such as a high voltage pin VIN, a power pin VCC, a current sensing pin CS, a feedback pin FB, an output pin DRV, a ground pin GND, etc. These pins are connected with peripheral components and used to receive or output signals. The control unit 210 can provide PWM driving signal $V_G$ through the output pin DRV to control switching of the power switch 208 (NMOS transistor). When the NMOS transistor 208 is turned on, the primary side winding of the transformer 205 stores energy. When the NMOS transistor 208 is turned off, the transformer 205 releases energy through the secondary winding and the auxiliary winding 211 to respectively establish an output power $V_{out}$ to the load 213 and an operating power VCC to the control unit 210.

Referring to FIG. 2, the detection circuit 202 is coupled to the safety capacitor Cx and the input rectification and filtering unit 203. The detection circuit 202 includes the first diode D1, the second diode D2 and the first resistor R1. The anode of the first diode D1 is connected to the neutral line N, and the anode of the second diode D2 is connected to a live line L. The cathodes of D1 and D2 are commonly connected and connected to one end of the first resistor R1, and the other end of the first resistor is connected to the VIN pin of the control unit 210. The anodes of the first diode D1 and the second diode D2 are respectively used to receive the AC input voltage ACin, and the cathodes of the first diode D1 and the second diode D2 are used to provide the rectified voltage. Therefore, the detection circuit 202 can provide the rectified voltage signal Vvin related to the AC input voltage and the rectified current signal Ivin flowing into the VIN pin through the first resistor R1.

The control unit 210 has a plurality of pins to receive or output signals, such as the power pin VCC, the ground pin GND, the high voltage pin VIN, the output pin DRV, the feedback pin FB, and the current detection pin CS. The control unit 210 can receive a required operating voltage through the power pin VCC, and is coupled to the ground terminal through the ground pin GND, such that the control unit 210 can normally operate and regulate the received operating voltage to generate working voltages required by various functional circuits in the control unit 210. In the present invention, the high voltage pin VIN of the control unit 210 can receive the rectified voltage signal Vvin and the rectified current signal Ivin related to the AC input voltage. The control unit 210 can use its internal circuit to determine whether the switching mode power supply is in a single power line connection state (L connected, N disconnected) by comparing the waveform and peak value of the rectified voltage signal Vvin or the rectified current signal Ivin. The control unit 210 can decide to stop or continue the operation of the flyback power converter 20 based on the compared result to provide protection for the load (electrical equipment) 213.

In one embodiment, the internal circuit of the control unit 210 may include a sampling circuit coupled to the high voltage pin VIN, and is configured to sample the input rectified voltage signal Vvin or the rectified current signal Ivin to generate a sampling signal. A peak detection circuit is coupled to the sampling circuit and generates a reference voltage based on the peak change of the sampling signal. A comparator generates a comparison signal by comparing the sampling signal with the reference voltage, and controls the operation of the control unit 210 according to the comparison signal, such as outputting an interrupt operation or a continuous operation signal to respectively control the power conversion circuit 220 to stop output or continue output power.

In one embodiment, when the switching mode power supply 20 is in a single power line connection state (L connected, N disconnected), the rectified voltage signal Vvin or the rectified current signal Ivin received by the high voltage pin VIN is a half-wave waveform (refer to FIG. 5), and the internal circuit of the control unit 210 outputs an interrupt operation signal to stop powering the load. When the switching mode power supply 20 is in the normal power line input state (both L and N are connected), the waveform of the rectified voltage signal Vvin or the rectified current signal Ivin received by the high voltage pin VIN is a full-wave waveform (refer to FIG. 4), and the internal circuit of the control unit 210 outputs a continuous operation signal to continue supplying power to the load.

Figure 3:
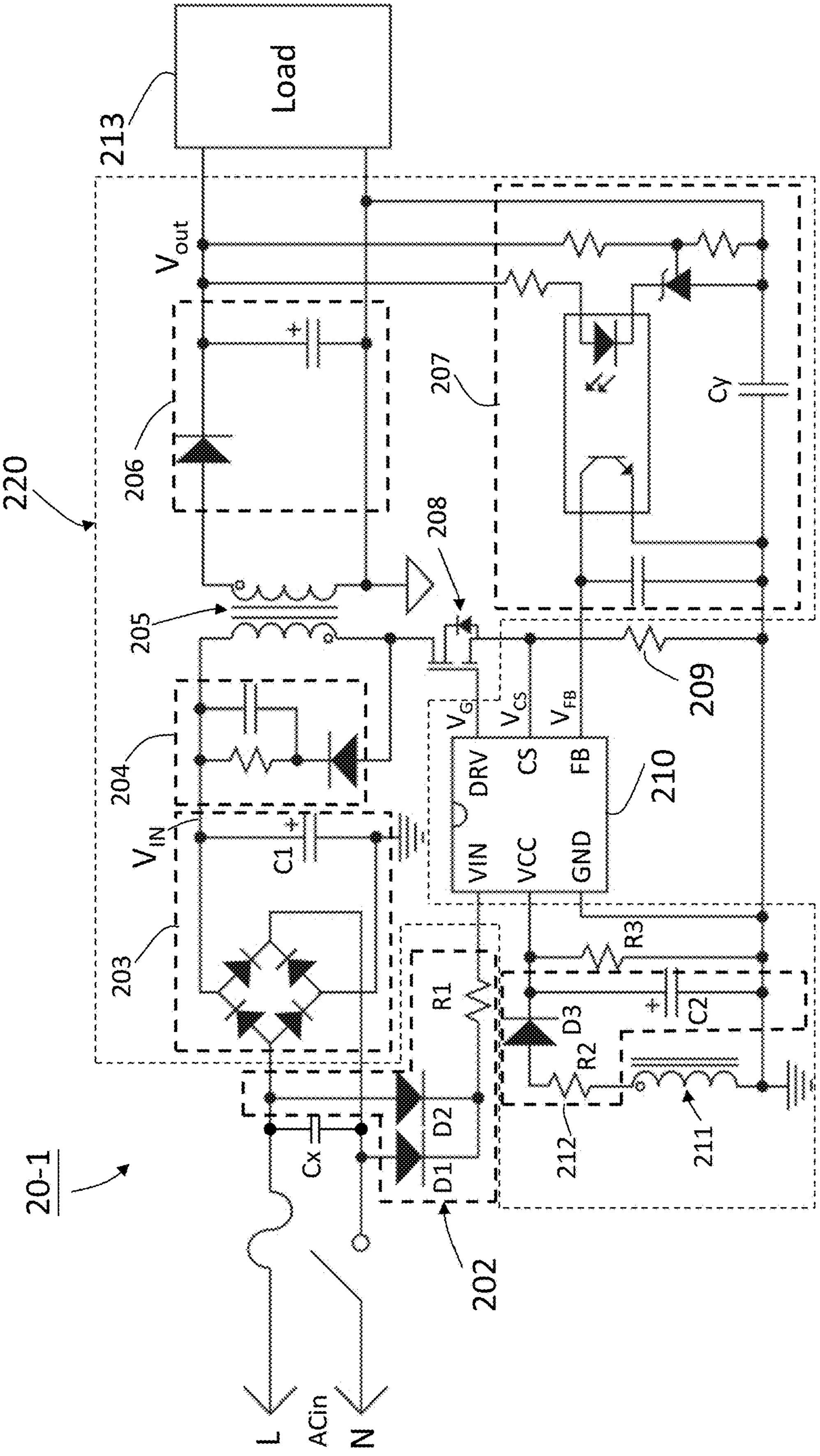
FIG. 3 is a schematic system circuit diagram of a switching mode power supply with single power line detection circuit according to another embodiment of the present invention.

FIG. 3 is a schematic system circuit diagram of a switching mode power supply (for example, a flyback power converter) 20-1 with single power line detection circuit according to another embodiment of the present invention. The single power line detection circuit depicts in FIG. 3, in addition to the detection circuit 202 disclosed in FIG. 2, it further includes a discharge resistor R3 connected across the VCC pin and the GND pin of the control unit 210. The discharge resistor R3 is connected in parallel with the second filter capacitor C2 of the auxiliary rectifier and filter unit 212 of the auxiliary winding 211 to provide a discharge path for the auxiliary winding 211. When the flyback power converter 20-1 is in the single power line connection state (L is connected and N is disconnected), the leakage current of the system charges the second filter capacitor C2 and then is discharged through the discharge resistor R3. The voltage of the second filter capacitor C2 cannot reach the starting voltage of the control unit 210, such that the switching operation will not be performed. Therefore, the load coupled to the flyback power converter 20-1 (for example, electrical equipment) is protected.

In one embodiment, the auxiliary rectifier and filter unit 212 includes a filter resistor R2, the third diode D3 and a second filter capacitor C2. One end of the filter resistor R2 is coupled to the first end of the auxiliary winding 211, the other end of the filter resistor R2 is coupled to the anode of the third diode D3, the positive end (+) of the filter capacitor C2 is coupled to the cathode of the third diode D3, and the negative end (−) of filter capacitor C3 is coupled to the second end (ground) of the auxiliary winding 211. The cathode of the third diode D3 and the positive end of the second filter capacitor C2 are coupled to VCC pin of the control unit 210.

Figure 4:
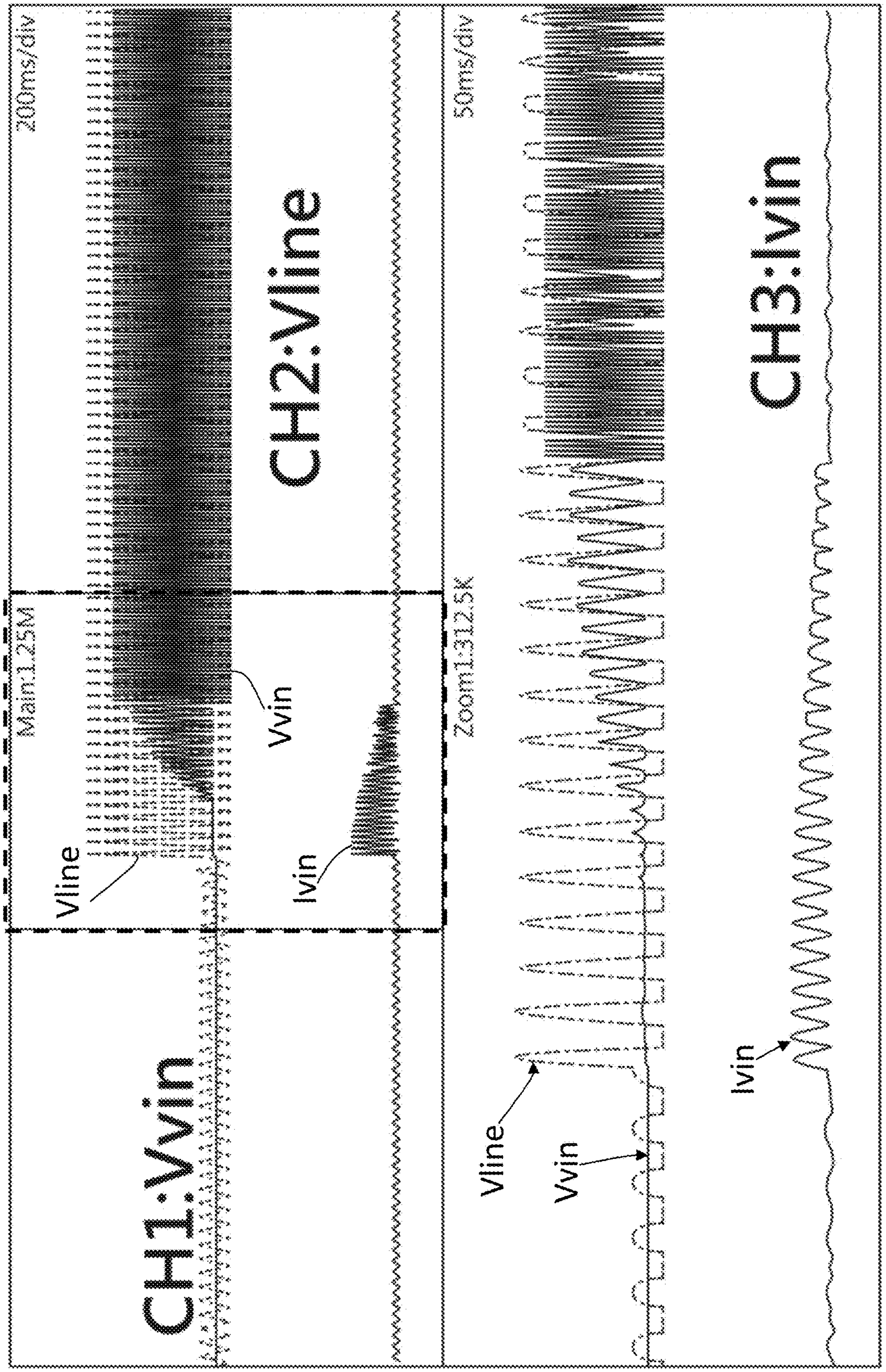
FIG. 4 shows waveform diagrams of L input voltage signal, VIN voltage signal and current signal measured from the switching mode power supply depicted in FIG. 2, when the live wire L and the neutral line N are normally connected to the AC power supply.

FIG. 4 shows waveform diagrams of live wire (L) input voltage signal (Vline), voltage signal (Vvin) and current signal (Ivin) of the VIN pin measured from the switching mode power supply (flyback power converter) 20 depicted in FIG. 2, when the live wire L and the neutral line N are normally connected to the AC power supply. The L input voltage signal (Vline) is represented by dashed line, while the voltage signal (Vvin) and the current signal (Ivin) of the VIN pin are represented by solid lines. The waveform diagrams of the L input voltage signal (Vline), the voltage signal (Vvin) of the VIN pin, and the current signal (Ivin) of the VIN pin at the bottom are partial enlargements of the dotted box at the top of the diagram. Since the detection circuit 202 has rectification function, both the voltage signal (Vvin) and the current signal (Ivin) received by the VIN pin of the control unit 210 have full-wave rectified waveforms.

Figure 5:
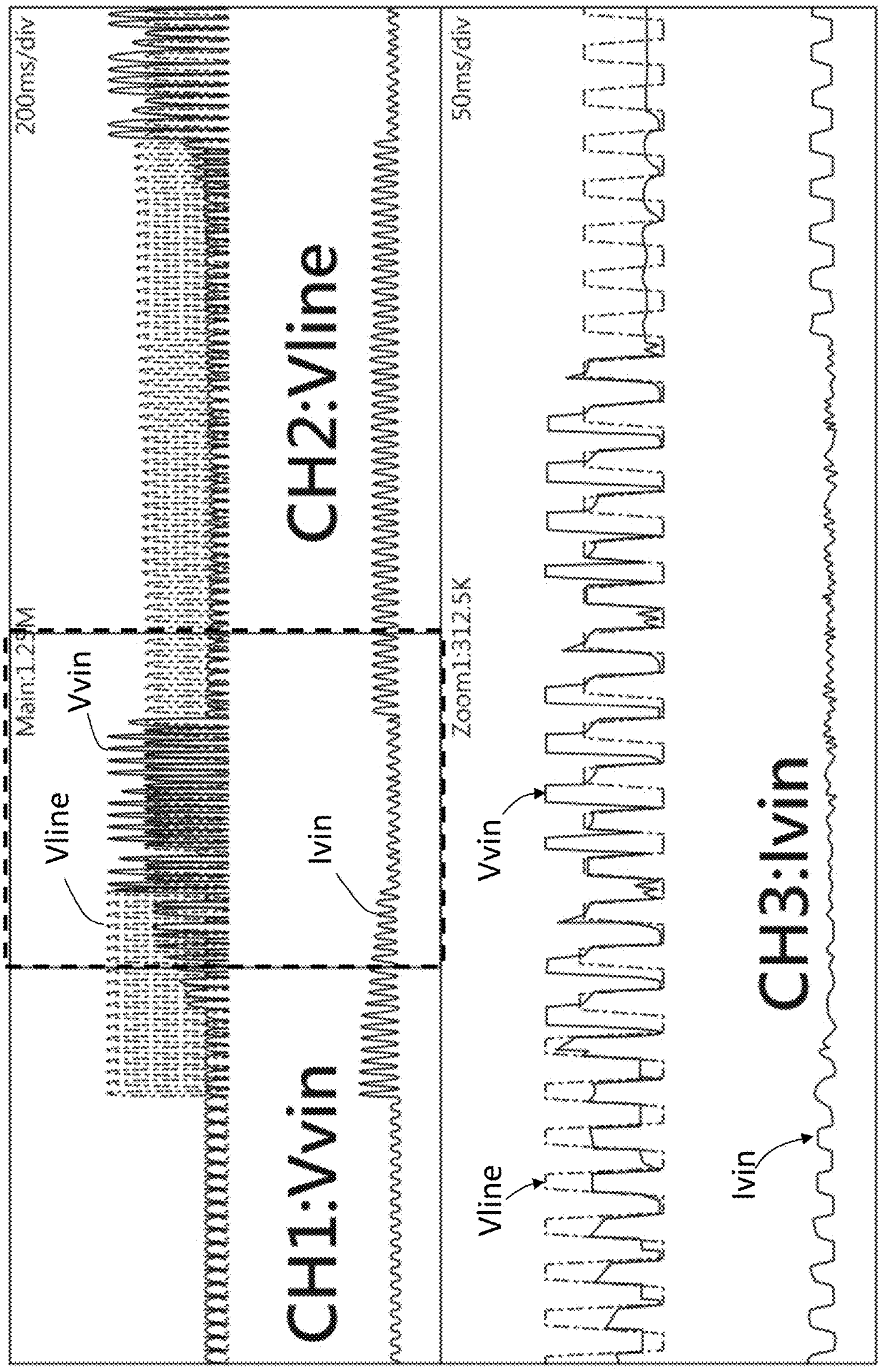
FIG. 5 shows waveform diagrams of L input voltage signal, VIN voltage signal and current signal measured from the switching mode power supply depicted in FIG. 2, when the live wire L is connected to the AC power supply and the neutral line N is disconnected.

FIG. 5 shows waveform diagrams of L input voltage signal (Vline), voltage signal (Vvin) and current signal (Ivin) of the VIN pin measured from the switching mode power supply (flyback power converter) 20 depicted in FIG. 2, when the live wire L is connected and the neutral line N is disconnected to the AC power supply. The L input voltage signal (Vline) is represented by dashed line, while the voltage signal (Vvin) and the current signal (Ivin) of the VIN pin are represented by solid lines. The waveform diagrams of the live L input voltage signal (Vline), the voltage signal (Vvin) of the VIN pin, and the current signal (Ivin) of the VIN pin at the bottom are partial enlargements of the dotted box at the top of the diagram. Since the detection circuit 202 has rectification function, both the voltage signal (Vvin) and the current signal (Ivin) received by the VIN pin of the control unit 210 have half-wave rectified waveforms.

While various embodiments of the present invention have been described above, it should be understood that they have been presented by a way of example and not limitation. Numerous modifications and variations within the scope of the invention are possible. The present invention should only be defined in accordance with the following claims.

What is claimed is:

1. A switching mode power supply with single power line detection circuit, comprising:
- a power conversion circuit receiving an AC input voltage from an input side and converting said AC input voltage into a DC output voltage;
- a safety capacitor connected across said input side;
- a control unit coupled to said power conversion circuit to control an operation of said power conversion circuit;
- a detection circuit coupled to said safety capacitor, said power conversion circuit and said control unit; and
- wherein said control unit determines whether said switching mode power supply is in a single power line connection state based on a waveform of a voltage signal or a current signal detected by said detection circuit.

2. The switching mode power supply of claim 1, wherein said detection circuit includes:
- a first diode, having an anode of said first diode connected to a neutral line (N) of said input side;
- a second diode, having an anode of said second diode connected to a live wire (L) of said input side;
- a first resistor, having a first end of said first resistor connected to said control unit; and
- wherein a cathode of said first diode is commonly connected to a cathode of said second diode and connected to a second end of said first resistor.

3. The switching mode power supply of claim 2, wherein said first diode and said second diode are used to receive said AC input voltage and output a rectified voltage signal.

4. The switching mode power supply of claim 3, wherein said rectified voltage signal generates a rectified current signal flowing into said control unit through said first resistor.

5. The switching mode power supply of claim 4, wherein said control unit receives said rectified voltage signal and said rectified current signal, and determines whether said switching mode power supply is in said single power line connection state by comparing said waveform of said rectified voltage signal or said rectified current signal.

6. The switching mode power supply of claim 5, when said rectified voltage signal or said rectified current signal is a half-wave waveform, wherein said switching mode power supply is in said single power line connection state.

7. The switching mode power supply of claim 6, when said switching mode power supply is in said single power line connection state, wherein said control unit turns off said power conversion circuit through its internal circuit to stop outputting voltage to a load coupled thereto.

8. The switching mode power supply claim 1, wherein said power conversion circuit further includes:
- an input rectification and filtering unit coupled to said safety capacitor and performs full-wave rectification and filtering on said AC input voltage to generate an input voltage;
- a transformer conversion circuit coupled to said rectification and filtering unit, and being controlled by said control unit to transform said input voltage to generate said DC output voltage; and
- an auxiliary winding unit coupled to said transformer conversion circuit to generate a DC supply voltage for said control unit.

9. The switching mode power supply of claim 8, wherein said auxiliary winding unit comprises:
- an auxiliary winding having a first end and a second end, said second end connected to ground;
- an auxiliary rectification and filtering unit including a filter resistor, a third diode and a filter capacitor, wherein one end of said filter resistor is connected to said first end of said auxiliary winding, another end of said filter resistor being connected to an anode of said third diode, a positive end of said filter capacitor being connected to a cathode of said third diode, and a negative end of said filter capacitor being connected to said second of said auxiliary winding; wherein said cathode of said third diode is coupled to said control unit.

10. The switching mode power supply of claim 9, wherein said auxiliary winding unit further includes a discharge resistor connected in parallel with said filter capacitor to provide a discharge path, such that said filter capacitor fails to reach a starting voltage of said control unit when said switching mode power supply is in said single power line connection state.

11. A switching mode power supply with single power line detection circuit, comprising:

a power conversion circuit receiving an AC input voltage from an input side and converting said AC input voltage into a DC output voltage;

a safety capacitor connected across said input side;

a control unit coupled to said power conversion circuit to control an operation of said power conversion circuit;

a detection circuit coupled to said safety capacitor, said power conversion circuit and said control unit;

wherein said power conversion circuit further includes:

an input rectification and filtering unit coupled to said safety capacitor and performs full-wave rectification and filtering on said AC input voltage to generate an input voltage;

a transformer conversion circuit coupled to said input rectification and filtering unit, and is controlled by said control unit to transform said input voltage to generate said DC output voltage;

an auxiliary winding unit coupled to said transformer conversion circuit to generate a DC supply voltage for said control unit; and wherein said control unit determines whether said switching mode power supply is in a single power line connection state based on a waveform of a voltage signal or a current signal detected by said detection circuit.

12. The switching mode power supply of claim 11, wherein said detection circuit includes:

a first diode, having an anode of said first diode connected to a neutral line (N) of said input side;

a second diode, having an anode of said second diode connected to a live wire (L) of said input side;

a first resistor, having a first end of said first resistor connected to said control unit; and wherein a cathode of said first diode is commonly connected to a cathode of said second diode and connected to a second end of said first resistor.

13. The switching mode power supply of claim 12, wherein said first diode and said second diode are used to receive said AC input voltage and output a rectified voltage signal.

14. The switching mode power supply of claim 13, wherein said rectified voltage signal generates a rectified current signal flowing into said control unit through said first resistor.

15. The switching mode power supply of claim 14, wherein said control unit receives said rectified voltage signal and said rectified current signal, and determines whether said switching mode power supply is in said single power line connection state by comparing said waveform of said rectified voltage signal or said rectified current signal.

16. The switching mode power supply of claim 15, when said rectified voltage signal or said rectified current signal is a half-wave waveform, wherein said switching mode power supply is in said single power line connection state.

17. The switching mode power supply of claim 16, when said switching mode power supply is in said single power line connection state, wherein said control unit turns off said power conversion circuit through its internal circuit to stop outputting voltage to a load coupled thereto.

18. The switching mode power supply of claim 11, wherein said auxiliary winding unit comprises:

an auxiliary winding having a first end and a second end, said second end connected to ground;

an auxiliary rectification and filtering unit including a filter resistor, a third diode and a filter capacitor, wherein one end of said filter resistor is connected to said first end of said auxiliary winding, another end of said filter resistor being connected to an anode of said third diode, a positive end of said filter capacitor being connected to a cathode of said third diode, and a negative end of said filter capacitor being connected to said second of said auxiliary winding; and wherein said cathode of said third diode is coupled to said control unit.

19. The switching mode power supply of claim 18, wherein said auxiliary winding unit further includes a discharge resistor connected in parallel with said filter capacitor to provide a discharge path, such that said filter capacitor fails to reach a starting voltage of said control unit when said switching mode power supply is in said single power line connection state.

20. The switching mode power supply of claim 11, wherein transformer conversion circuit includes:

a transformer, having a primary side and a secondary side, said transformer coupled to said safety capacitor via said primary side;

a power switch coupled to said primary side of said transformer; and an output rectification and filtering unit coupled to said secondary side of said transformer.

* * * * *